US012005667B2

(12) United States Patent
Espe

(10) Patent No.: US 12,005,667 B2
(45) Date of Patent: Jun. 11, 2024

(54) PRESS PAD FOR A HYDRAULIC HEAT PRESS, AND METHOD FOR PRODUCING IT

(71) Applicant: HUECK Rheinische GmbH, Viersen (DE)

(72) Inventor: Rolf Espe, Bochum (DE)

(73) Assignee: HUECK Rheinische GmbH, Viersen (DE)

( * ) Notice: Subject to any disclaimer, the term of this patent is extended or adjusted under 35 U.S.C. 154(b) by 1607 days.

(21) Appl. No.: 16/037,526

(22) Filed: Jul. 17, 2018

(65) Prior Publication Data

US 2019/0001603 A1    Jan. 3, 2019

Related U.S. Application Data

(63) Continuation of application No. PCT/EP2017/051172, filed on Jan. 20, 2017.

(30) Foreign Application Priority Data

Jan. 20, 2016  (DE) .................. DE202016000367.5

(51) Int. Cl.
| | | |
|---|---|---|
| *B30B 15/06* | (2006.01) | |
| *B27D 3/02* | (2006.01) | |
| *B29C 64/112* | (2017.01) | |
| *B30B 7/02* | (2006.01) | |
| *B33Y 10/00* | (2015.01) | |
| *D06M 15/693* | (2006.01) | |
| *B33Y 80/00* | (2015.01) | |

(52) U.S. Cl.
CPC ............. *B30B 15/061* (2013.01); *B27D 3/02* (2013.01); *B29C 64/112* (2017.08); *B30B 7/02* (2013.01); *B30B 15/062* (2013.01); *B30B 15/064* (2013.01); *B33Y 10/00* (2014.12); *D06M 15/693* (2013.01); *B33Y 80/00* (2014.12)

(58) Field of Classification Search
CPC ... B30B 15/061; B30B 15/064; B30B 15/062; B30B 7/02; B33Y 80/00; B33Y 10/00; D03D 15/02; D03D 15/67; D06M 15/693; B27D 3/02; B29C 64/12
See application file for complete search history.

(56) References Cited

U.S. PATENT DOCUMENTS

| | | | | |
|---|---|---|---|---|
| 5,098,769 A | * | 3/1992 | Nakai ................... | H05K 3/182 428/209 |
| 2014/0196283 A1 | * | 7/2014 | Espe ..................... | B30B 15/061 29/829 |
| 2018/0036953 A1 | * | 2/2018 | Gottschalk-Gaudig ...... | B33Y 70/00 |

FOREIGN PATENT DOCUMENTS

| | | |
|---|---|---|
| DE | 2319593 | 11/1974 |
| DE | 2338749 A1 | 2/1975 |
| DE | 9017587 U1 | 3/1991 |
| DE | 29721495 U1 | 2/1998 |

(Continued)

*Primary Examiner* — Jeremy R Pierce
(74) *Attorney, Agent, or Firm* — Von Rohrscheidt Patents

(57) ABSTRACT

A press pad for a hydraulic single- or multi-stage heating press, the press pad comprising: a support fabric advantageously including metal threads; and an elastomeric material application made from a crosslinked rubber material, characterized in that the elastomeric material application is applied by a 3-D printing method to the support fabric by a printing arrangement, wherein the application is performed as a function of predetermined digitized data of a 3-D topography of the desired elastomeric material application.

10 Claims, 1 Drawing Sheet

(56) References Cited

FOREIGN PATENT DOCUMENTS

| | | |
|---|---|---|
| DE | 202007006849 U1 | 6/2008 |
| DE | 202015006923 | 10/2015 |
| EP | 0173762 A | 3/1986 |
| EP | 0173763 A1 | 3/1986 |
| EP | 0735949 B1 | 10/1996 |
| EP | 1136248 A1 | 9/2001 |
| EP | 1300235 A1 | 4/2003 |
| EP | 2756947 A1 | 7/2014 |
| JP | S50133969 | 2/1975 |
| JP | 2015512816 A | 6/2008 |
| JP | 2014136259 A | 7/2014 |
| WO | WO2014011110 A1 | 1/2014 |
| WO | WO2014/209994 A2 | 12/2014 |

\* cited by examiner

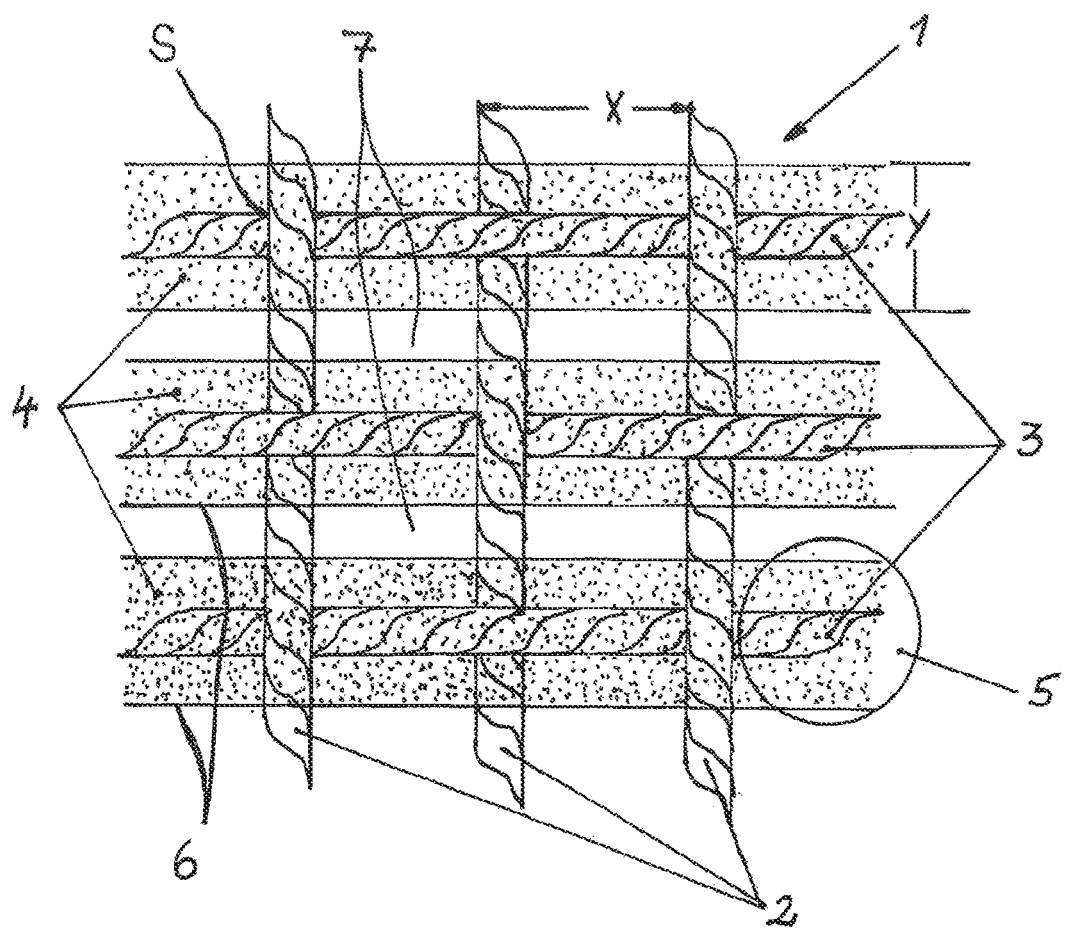
FIG. 1
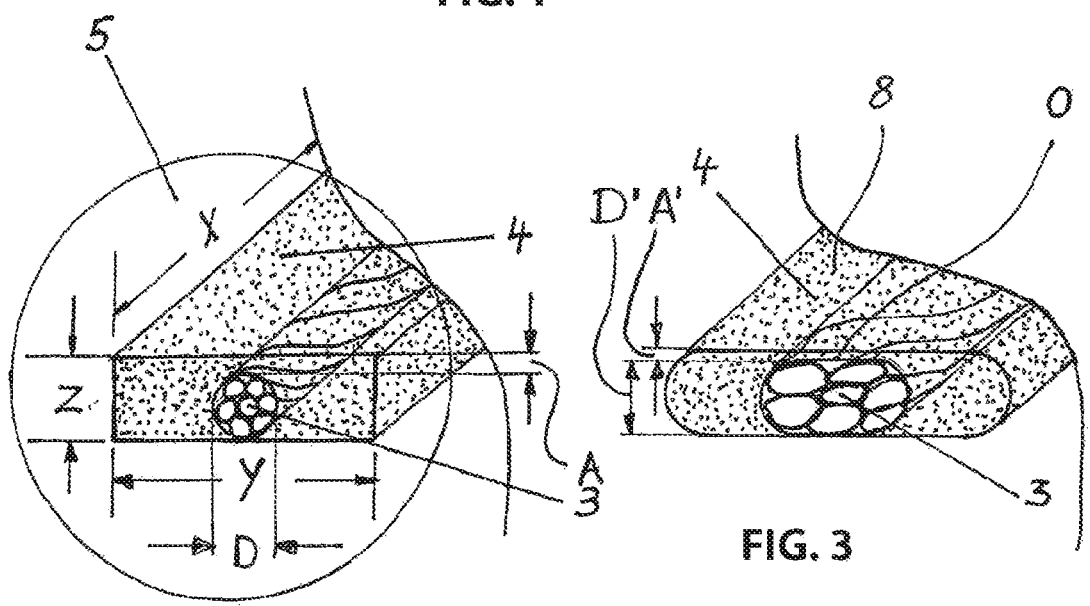
FIG. 2
FIG. 3

PRESS PAD FOR A HYDRAULIC HEAT PRESS, AND METHOD FOR PRODUCING IT

RELATED APPLICATIONS

This application is a continuation of International Application PCT/EP 2017/051172 filed on Jan. 20, 2017, claiming priority from German patent application DE 20 2016 000 367.5 filed on Jan. 20, 2016.

FIELD OF THE INVENTION

The invention relates to a press pad for a hydraulic, single-level or multi-level heating press, the press pad including a support fabric advantageously including metal threads and an elastomeric material coating made from a crosslinked rubber material or silicone rubber.

Furthermore, the invention relates to a method for producing a press pad of the type recited supra.

BACKGROUND OF THE INVENTION

Hydraulic heating presses are used in the art to coat wood material plates with various plastic materials wherein the wood material plates are subsequently used for producing furniture or as floor tiles. However, also other plate materials like, e.g., HPL compact plates (high pressure laminates) can be used. When producing floor boards typically so-call HDF plates (high density fiber board) are coated with synthetic resin infused decorative papers which are imprinted or provided in one color. The synthetic resins typically are duroplastic resins which go through a terminal condensation in the heating presses under pressure and temperature and which form irreversible solid surfaces.

The high-α pulp papers that are being used are infused with precondensed laminating resins which are made to a large extent from melamine-/formaldehyde or its mixing resins melamine-/polyuria and formaldehyde in impregnating plants with subsequent drying zone and precondensed up to a particular molecule chain length. The papers thus created, also designated synthetic resin films, can then be subsequently used in the press arrangements.

Partially thin resin-impregnated overlay papers are added over the decorative films. The overlay papers have surface weights of 20 g/m² up to 60 g/m² and are additionally provided with abrasion-resistant carborundum particles ($Al_2O_3$) either in the resin or the paper. These additives shall subsequently increase surface hardness of the floor tiles and protect them against abrasion. The hardness of the carborundum particles is approximately 1,800 HV (hardness according Vickers).

For carrier materials relatively hard wood material plates are being used based on HDF whose raw thicknesses are 900 kg/m³ to 1100 kg/m³. In order to coat plates of this type, high specific pressures are required which can be between 40 kg/m² to 60 k/m². In particular these pressing pressures are required when the surfaces are additionally embossed with a structure. In order to produce the floor boards the HDF raw material plates are run into the press arrangement together with the overlay papers and the imprinted decorative papers by a feeding arrangement. Since the press times are rather short and the finished plates are retrieved hot, the heating presses that are being employed are designated as "short-cycle presses" which are in this case single-level arrangements.

The necessary press plates and press pads are fixated in the arrangements and are constantly heated. The press pads that are respectively arranged between the heating plate and the press plate are used for pressure compensation which is required since the arrangements have thickness tolerances. Typically the tolerances are between 0.25 mm and 0.50 mm which tolerances, however, are not evenly distributed over the surface area of the press. Typically special pads are required which are used to compensate these uneven tolerances. In case this pressure compensation does not succeed and larger pressure differences occur during the press process over the surface area, this leads to non-transparent spots for the melamine resin surfaces. This is based on the condensation mechanism of duroplastic resins. During the condensation in the press arrangement water and formaldehyde are generated under pressure and temperature and released as a vapor. Since the system is closed during the pressing process above the press plates which are typically made from steel, the exiting water and formaldehyde vapor has to diffuse into the paper webs and the HDF plate.

In case this diffusion does not occur during the resin liquid phase, the steam bubbles remain enclosed while the resin viscosity increase progresses. These enclosed vaper bubbles show non-transparent surfaces due to the refraction index air/resin=1.0:1.55, which are perceived as voids. Especially for dark, decorative surfaces these voids are visible so-called "white spots". This has the effect that the plate material is discarded as flawed.

As recited supra, the thickness tolerances of the typical press arrangements are up to 0.5 mm. In order to establish a required minimum pressing pressure at all locations of the press over the cross-sectional surface, two alternatives are possible: Either the pressing pressure is increased over the entire arrangement surface in that the required pressing pressure is provided at each location of the plate surface in order to form a closed and transparent surface, this means to prevent a gas bubble formation. However, it was determined that locally excessive pressing pressures, in particular when no compensating press pads are used, lead to a strong increase of the flowability (reduction of viscosity) of the impregnating resins at the respective surfaces. Excessive resin flow leads locally to surfaces that do not have enough resin since the resin penetrates in this case excessively into the cellulose fiber of the decorative papers and then forms an insufficient resin layer above the decorative paper at the respective location. Lack of resin also does not replicate the gloss level of the press plates anymore and surfaces with uneven gloss levels are created.

As an alternative to a general pressing pressure increase it is also possible to use press pads which cause a sufficient pressure distribution and compensation even for large thickness tolerances in the heating press so that spots with excessively low pressing pressure do not exist. An adaptation to the individual properties of each press is in this case sometimes unavoidable though very complex. Typically the known press pads have a constant thickness over their entire surface and are typically formed from threads made from different materials. The different known embodiments typically do not comply with the requirements of modern coating processes.

DE 23 19 593 discloses a metal fabric that functions as a support fabric which is subsequently coated with a non-crosslinked silicon resin, and thereafter the curing or cross-linking is performed in a separate step. Both sides of the known press pads have to be coated separately from each other and the coating has to be cured.

DE 90 17 587 U1 describes a press pad which is made from a flexible pad fabric which includes an aromatic polyamide yarn and different additional yarn materials. The known press pad furthermore includes metal threads with a content of up to 70% with reference to the total weight of the press pad which sets the heat conduction capability of the press pad to the required value.

EP 0 173 763 A1 describes a press pad for high- and low-volume presses which is made from various materials, e.g., yarn from aromatic polyamide with metal threads, heat resistant filament made from rubber or a rubber mix, heat resistant filament made from silicon or silicon mixes with and without metal threads.

A press pad according to EP 0 735 949 B1 is known. In this press pad the warp threads and/or the weft threads include a silicon elastomeric material. In the fabric, e.g., solid threads, made from silicon can be included or also threads which include a core made from metal wire and which are jacketed with silicon.

Another press pad is known from EP 1 136 248 A1. The press pad includes a fabric which includes a substantial percentage of a floor elastomeric material and/or silicon floor elastomeric material. The fabric can also include an essential portion of a blended elastomeric material which is produced by crosslinking a mix made from a silicon rubber material and a floor rubber material or a silicon floor rubber material. The described elastomeric materials types are thus configured as a thread material and woven into a corresponding fabric which includes metal threads which are stranded into warp threads or weft threads.

Furthermore, a press pad is known from EP 1 300 235 A1 wherein the press pad includes a textile carrier with threads wherein at least a portion forms heat conducting threads which cause heat conduction from an outside to an opposite outside of the press pad directly or through contact with other heat conducting threads. The carrier includes a pad layer made from a rubber elastic material in the portion of the intersecting threads. It is a particularity of this press pad that the thickness of the pad layer is less than the thickness of the carrier and the pad layer is embedded into the carrier so that heat conducting threads protrude on the both outsides of the press pad beyond the pad layer. Thus, the pad layer shall be introduced into the fabric by a blade coating process.

The fabric of all known press pads is produced on suitable weaving machines. The known press pads have a uniform, i.e., constant thickness over their entire surface and are therefore only marginally suitable to compensate thickness tolerances that are provided in the press arrangements. In order to provide the required specific pressing pressure during operations also at locations with a larger distance between the press pads the pressing pressure is increased over an entire surface of the press arrangement. As stated supra, this may lead to extremely high pressing pressures in certain locations and to unacceptable resin displacement in those locations which in turn cause surface voids.

BRIEF SUMMARY OF THE INVENTION

Thus, it is an object of the invention to propose a press pad and a method for producing the press pad which compensates the thickness tolerances and the pressure and temperature differences in the press arrangement associated therewith during press operations so that the pressing pressure and the temperature are as uniform as possible over an entire surface of the press pad and of the pressing material so that void free surfaces can also be produced even for complicated embossing structures.

Improving upon a press pad of the type described supra, the object is achieved in that the elastomeric material is applied in a 3-D printing process by a printing arrangement onto the support fabric, wherein the elastomeric material is applied according to previously determined digitized data of a 3D topography of the desired elastomeric material application.

According to the invention, different thickness tolerances of the press arrangement, the press plates and, if desired, also of the wood material plates are considered. After producing a virtual drawing the data that is specific for the press arrangement or for the pressing material is entered into a computer program for controlling the press arrangement. From this the 3-dimensional coordinates are computed, which are required for positioning the X, Y and Z axes that are required for the printing process. After generating a print command the rubber material is advantageously applied in layers. The local temperature differences in the press arrangement that occur during subsequent press operations are considered when producing the fabric base material.

In order to subsequently apply the elastomeric material, a support fabric is initially produced which is advantageously made from metal threads since they have good heat conducting properties. Suitable metal threads are, e.g., copper, brass, bronze, aluminum or steel. Other metals can be used as required. The metal fabric can also be made from different metal threads depending on the desired heat conductivity in order to achieve a differentiated heat distribution within the press arrangement. A particular bonding type of the support fabric is not prescribed as mandatory, but the selection is done according to the technical requirements of the respective coating arrangement, this means press arrangement. The weave construction "plain weave" has proven advantangeous. It is advantageous for the weaving process of a metal fabric to use stranded metal threads as weft threads and/or warp threads. When uniform heat conductivity of the support fabric is required, the warp threads and the weft threads have to made from the same type of metal. When there is an uneven heat distribution at the press arrangement this uneven heat distrubtrion can already be considered during the fabric production according to the heat distrubtion patterns of a press arrangement. The respective weft and/or warp threads then require metal threads with different heat conductivities. The heat distribution zones of the heat plates of the respective press arrangement are thus measured initially with thermal elements or with a thermal imaging camera. Thereafter a distribution pattern is sketched out and the respective zones are transferred to the poster size. According to this pattern the warp threads and the weft threads can be subsequently determined and the zones can be transposed into the metal fabric.

Thus, the rubber material is applied to the support fabric by a 3-D printing arrangement and is advantageously performed according to the printing instructions which were previously generated and implemented into the control software of the printing arrangement. Different thickness tolerances that are provided in the press arrangements are also precisely determined and considered initially. For this purpose known methods are used in that, e.g., a deformation of a lead- or tin-wire caused by the pressing process, in particular its thickness variation, is measured. Also printing papers like they are used, e.g. in a needle printer, can be helpful to identify zones through different discolorations of the printing paper.

When all data is determined an engineering drawing of a press pad is generated by a CAD program, and the 3-dimensional coordinates X, Y, Z are comouted that are required for generating the printing program. The printing arrangement can be precisely controlled by the digitized data so that an almost identical reproduction of the pad layer can be performed.

The particularity of the press pad according to the invention and of its production method is that partially different pad layers can be applied when the elastomeric materials is applied wherein the pad layers precisely reflect the geometric properties of the respective press arrangement in order to avoid larger pressure differences over the press surface during subsequent press operations. On the other hand side, prior art press pads are only produced in a weaving process, wherein the elastomeric material configured as a jacket layer with uniform thickness is already included in the threads to be woven together, or wherein rubber layers with uniform thickness are applied to a carrier or support fabric with uniform thickness in a blade coating process and cured thereafter. In the two manufacturing processes partially different pad thicknesses are not provided since the production process does not facilitate this.

In order to produce a press pad according to the invention the support fabric that is advantageously made from metal and produced in a first step is mounted flad on a printing table of the printing arrangement and fixed. The printing head is run along a longitudinal edge of the operating table when producing the pad layers wherein the longitudinal edge is advantageously the Y-axis. The printing head moves back and farther perpendicular to the Y-axis, this means in a direction of the X-axis. A UV-light source is connected thereafter and is run behind the printing head in a similar manner. In order to increase performance and throughput of the print arrangement, several printing heads and UV-light sources within the same printer can be used simultaneously.

A special rubber mix is used for applying layers of the pad layer wherein the rubber mix advantageously includes a platinum catalytic converter. Thus crosslinking the rubber molecules is performed by UV-light. The nozzle of the printing arrangement deposits one rubber drop after another on the support fabric exactly where determined by the CAD program. Thus, a 3-dimensional pad layer is generated layer by layer from the virtual drawing. A UV-light source that is positioned at the printing arrangement moves over the printed drops which have flowed together into narrow strips and crosslinks or vulcanizes the (silicon) rubber material into a (silicon) elastomeric material. The printing arrangement subsequently applies another layer of the silicon rubber material which connects with the already vulcanized layer. This way a homogenous "body" or a homogenous pad layer is generated. The number of the individual layers that are applied on top of each other is a function of the predetermined thickness of the elastomeric materials application wherein the thickness extends, for example, in a direction of the Z-axis of the selection coordinate system.

BRIEF DESCRIPTION OF THE DRAWINGS

The invention is subsequently described in more detail with reference to an embodiment of a press pad which is illustrated in the drawing figure, wherein:

FIG. 1 illustrates a top view of a press pad with intersecting warp threads and weft threads;

FIG. 2 illustrates a blown-up detail of a warp thread with silicon elastomeric material attached thereto; and FIG. 3 illustrates the detail of FIG. 2 in compressed condition of the weft thread under pressing pressure.

DETAILED DESCRIPTION OF THE INVENTION

A press pad 1 includes a support fabric S that is formed from intersecting warp threads and weft threads 3 which are respectively made from individual stranded metal threads. The X-coordinate thus runs in a direction of the weft threads 3, the Y-coordinate runs in a direction of the warp threads 2, and the Z-coordinate extends perpendicular to the X-coordinate as well as to the Y-coordinate. The Z-coordinate thus extends in a thickness direction of the press pad 1.

In the instant case a silicon elastomeric material application 4 configured as strips 6 extends parallel to the weft threads 3. The strips 6 of the silicon elastomeric material application 4 have a width B which is significantly larger than a diameter D of the weft threads 3 (thus approximately 3 to 4 times), wherein the individual strips 6 of the silicon elastomeric material application 4 do not contact each other, and therefore strip-shaped clear spaces 7 remain in a direction of the weft threads 3 respectively between adjacent weft threads 3 wherein the clear spaces are interrupted by the respective warp threads 2. A width of the clear spaces 7 corresponds approximately to the diameter D of the weft threads 3.

FIG. 2 illustrates an enlarged view of a detail 5 of FIG. 2 in an enlarged perspective view. From an imaginary sectional view parallel to the Z-coordinate through a weft thread 3 it is detectable that the strip-shaped silicon elastomeric material application 4 has an application height Z, an application width Y and an application length X, wherein the application lengths that extend between two adjacent warp threads 2 are respectively arranged adjacent to each other in a direction of the X-coordinate in order to achieve a length of the silicon elastomeric material application 4 that extends over an entire length of the weft threads 3 in the press pad 1.

From FIG. 3 it can be derived that the silicon elastomeric material application 4 as well as the metal weft thread 3 is compressed during a pressing process, this means under an impact of the pressing pressure. Thus, the silicon elastomeric material application 4 changes its cross-sectional shape from rectangular with comparatively sharp edges to oval, this means with a top side and a bottom side that are parallel with each other, and rounded sidelines, this means convex side surfaces. The weft threads 3 are deformed from a circular cross-section in an unloaded condition to an oval cross-section under an impact of presses, wherein the thickness D' measured in a direction of the Z-coordinate is reduced accordingly relative to the original diameter D.

As evident from FIG. 3, all lower metal threads and all upper metal threads when the press pad 1 is turned ("lower" and "upper" respectively with reference to the intersection points of the warp threads 2 and the weft threads 3) are in close and uniform contact with the heating plate and/or the press plate (both not drawn in FIG. 3). This provides an even heat flow under the pressing pressure from the heat plate onto the pressing material, wherein the pressing pressure has a positive effect upon the quality of the described surfaces.

In the prior art all press pads only transfer heat partially since they only have a punctiform contact with the heat plate. When using the woven press pads with silicon threads only the free, upward protruding metal threads are in contact with the heat plates. In the flat pads that are coated with the silicon elastomeric material only the metal pads that protrude beyond the silicon elastomeric material can form the heat conducting contact. However, the press pad 1 according to the invention only includes a pad layer, this means an elastomeric material application 4 on one side, namely on the coated side. The uncoatewd side uses the larger metal surface as a contact surface which facilitates quick heat ransfer in the press arrangement.

When the press pad 1 under is compressed under pressure, the silicon elastomeric material application 4 is compressed as illustrated in FIG. 3, so that the metal warp threads 2 and the weft threads 3 also are in very close contact with the heat plate or the press plate on the coating side (depending on the orientation when inserted into the press arrangement). This is evident when comparing the distances A and A' between the topside O of the weft thread 3 embedded into the silicon elastomeric material application 4 in unloaded condition according to FIG. 2 relative to the compressed condition according to FIG. 3 and the surface of the press pad 1. By displacing the silicon elastomeric materials application 4 in Y-direction in compressed condition according to FIG. 3 the (compressed) weft thread 3 is much closer to the surface 8 of the silicon elastomeric material application 4 and thus also to the surface of the press pad 1, than in unloaded condition which improves heat conductivity through the pad. At the bottom side of the silicon elastomeric material application 4 there is the weft thread 3 in unloaded condition (FIG. 2) as well as in loaded condition (FIG. 3) of the press pad 1 directly at the surface of the silicon elastomeric material application 4, which facilitates excellent heat transfer also in this case. In compressed condition of the press pad according to FIG. 3, the heat transferring contact is improved by the illustrated broadening of the weft thread 3 into an oval shape. It is appreciated that applying the non-crosslinked silicon elastomeric material during production of the press pad 1 is performed from the topside of the press pad 1 that is visible in FIG. 1 and in FIGS. 2 and 3. In spite of the wave pattern of the warp threads 2 and the weft threads 3 that are woven together in the press pads 1 the strip-shaped silicon elastomeric material application 4 respectively forms a flat surface from which the embedded weft threads 3 respectively have a different upper distance over their length from the upward oriented surface 8 of the strips 6 of the silicon elastomeric material application 4.

REFERENCE NUMERALS AND DESIGNATIONS

1. Press pad
2. Warp thread
3. Weft thread
4. Silicon elastomeric material application
5. Detail
6. Strip
7. Free space
8. Surface
B Width
D Diameter
D' Thickness
O Top side
S Support fabric

What is claimed is:

1. A system of a press and a press pad for a hydraulic single- or multi-stage heating press, the press pad comprising:
    a support fabric including metal threads; and
    an elastomeric material application made from a cross-linked rubber material,
    wherein the elastomeric material application is applied by 3-D printing to only one side of the support fabric by a 3-D printing arrangement, and
    wherein the elastomeric material application is applied to the support fabric as a function of predetermined digitized data of a 3-D topography of a desired elastomeric material application.

2. The system according to claim 1, wherein the cross-linked rubber material is cross-linked in presence of a platinum catalytic converter.

3. The system according to claim 2, wherein platinum catalyzed rubber material is cross-linked or vulcanized by UV-light.

4. The system according to claim 1, wherein the cross-linked rubber material is a silicon rubber material, a fluor-silicon rubber material, a fluor-rubber material, or a mix or a blend from two or more rubber materials from the group consisting of silicon rubber material, fluor silicon rubber material, and fluor-rubber material.

5. The system according to claim 1, wherein a first layer of the elastomeric material application is connected with a second layer of the elastomeric material application that is applied above the first layer.

6. The system according to claim 1, wherein the metal support fabric has metal threads with different heat transfer capabilities which are arranged distributed over the press pad according to heat distribution zones which are provided in heating plates of the heating press.

7. The system according to claim 1,
    wherein the crosslinked rubber material is applied in strips which extend parallel to warp threads or weft threads of the support fabric, and
    wherein free spaces are formed between the strips that are parallel to each other.

8. The system according to claim 7, wherein the strips have a width significantly larger than a diameter of the weft threads.

9. The system according to claim 7, wherein the strips have a width 3 to 4 times larger than a diameter of the weft threads.

10. The system according to claim 1, wherein the free spaces have a width corresponding to approximately to a diameter of the weft threads.

* * * * *